March 20, 1956     A. E. ANDERSSON     2,738,996
RING SHAPED SEALING DEVICE
Filed Oct. 30, 1953     2 Sheets-Sheet 1
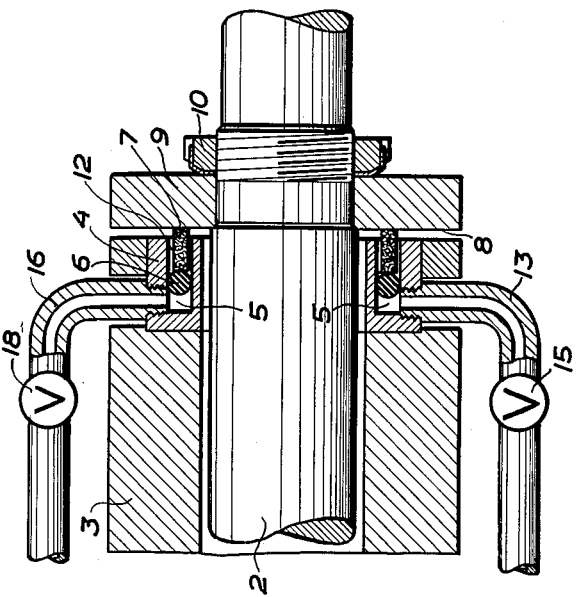
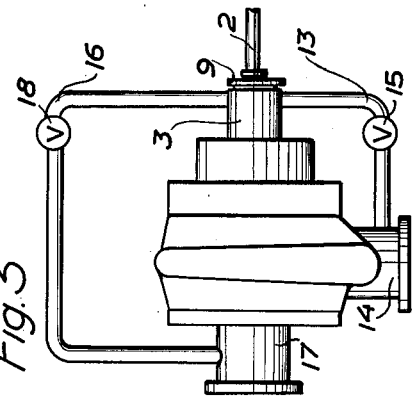
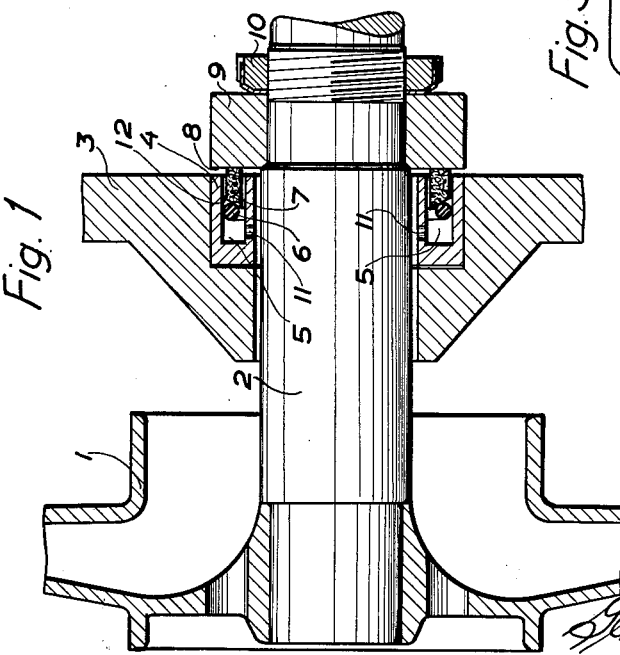
INVENTOR.
A. E. Andersson
BY
ATTYS.

March 20, 1956 A. E. ANDERSSON 2,738,996
RING SHAPED SEALING DEVICE
Filed Oct. 30, 1953 2 Sheets-Sheet 2
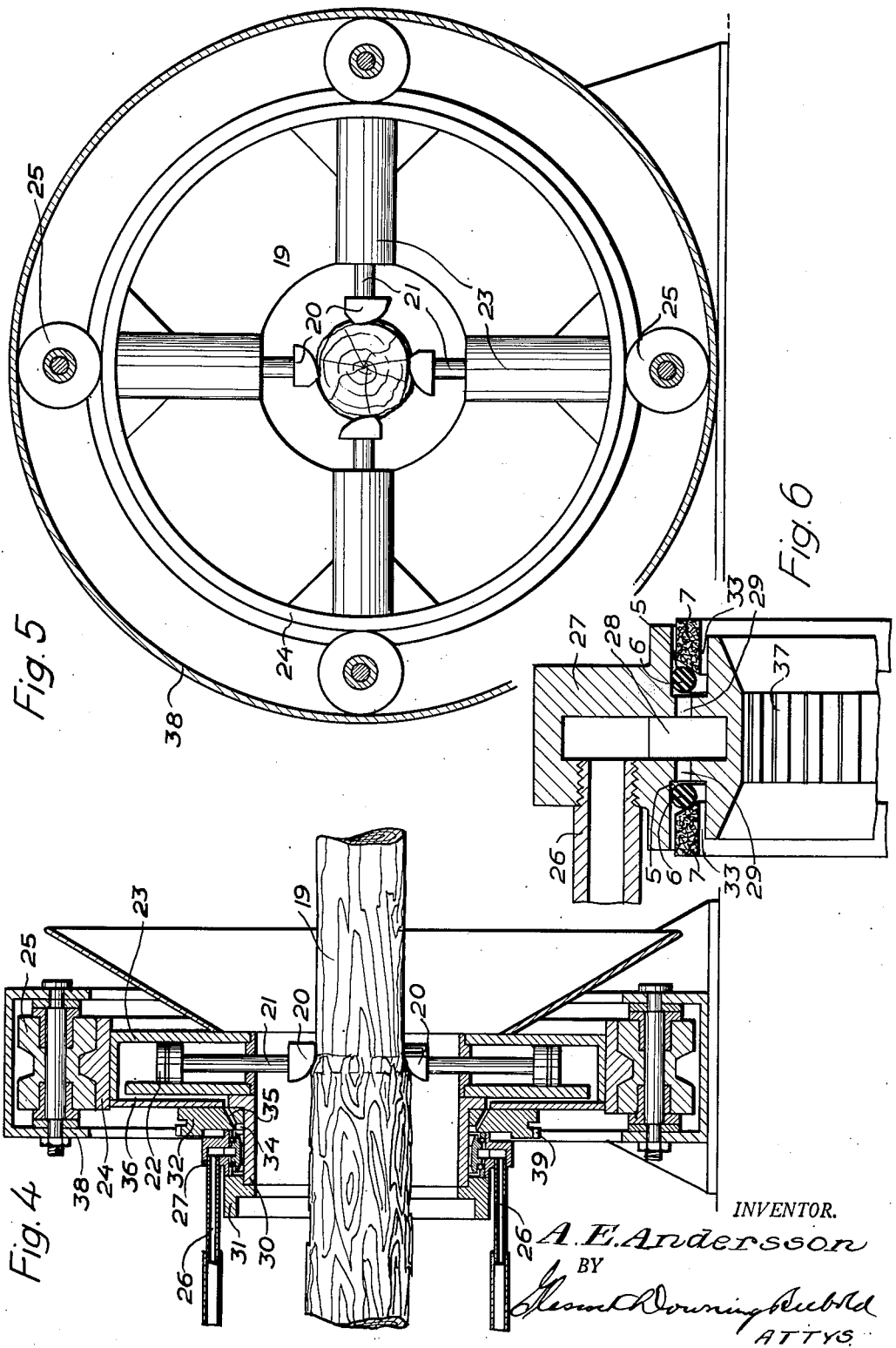
INVENTOR.
A. E. Andersson
BY
ATTYS.

United States Patent Office 2,738,996
Patented Mar. 20, 1956

2,738,996
RING SHAPED SEALING DEVICE

Axel Erland Andersson, Gavle, Sweden, assignor to Soderhamns Verkstader Aktiebolag Soderhamn, Sweden, a corporation of Sweden Application October 30, 1953, Serial No. 389,437

Claims priority, application Sweden November 15, 1952

4 Claims. (Cl. 286—9)

The present invention relates to a ring shaped sealing device for rotatable shafts, drums and the like. More particularly this invention relates to such a sealing device that is extraordinarily effective, economical to manufacture and easy to mount.

In accordance with the invention the sealing device consists of two axially movable sealing rings located adjacent to each other and having substantially the same outer diameter but being of different materials. Thus one ring is of inelastic material and preferably has self-lubricating properties provided therewith so as to seal with one of its surfaces against a rotatable sliding surface. The other ring is located behind the first mentioned ring and is of elastic material and in operation is deformed by a pressure medium so as to effect a seal between the outer circumference of the elastic ring and a cylindrical surface surrounding the same and at the same time to bring the first mentioned ring of inelastic material into sealing engagement against said sliding surface.

Some embodiments and modes of use for the sealing device according to the invention are illustrated by way of example in the attached drawings.

Fig. 1 is a longitudinal section through the pump wheel and the end bearing of a centrifugal pump.

Fig. 2 is a longitudinal section through the end bearing of a centrifugal pump showing another embodiment of the invention.

Fig. 3 is an external view on a reduced scale of the same centrifugal pump, showing the connecting pipes for teaching the flow of pressure medium relative to the sealing device.

Fig. 4 illustrates a ring shaped sealing device according to the invention, used on a debarking machine of the type where the barking tools are carried by a rotatable drum and actuated by a pneumatic or hydraulic pressure.

Fig. 5 is an end view of this machine as seen from the right in Fig. 4.

Fig. 6 illustrates on an enlarged scale and in section the arrangement of the sealing device shown in Fig. 4.

In Fig. 1 the centrifugal pump includes a rotor 1 driven by shaft 2. A part of the pump casing 3 is provided with a sealing box. In the pump casing part 3 is mounted a holder ring 4, having an annular groove 5 therein in which the two sealing rings 6 and 7 are located. The ring 6 is round in cross-section and consists preferably of soft rubber, while the ring 7 has a cross section in the shape of a parallel-trapezium and consists of an inelastic material preferably having self-lubricating properties. The material in the ring 7 can be of the kind which is known under the name of "Isolit" with a primary mass containing layers of asbestos or textile fabric and graphite. The ring 7 abuts with its outer end surface against a plain sliding surface 8 on a ring 9 for instance of cast iron, fixed on the shaft 2. The ring 9 is fixed by means of a nut 10. The space in the annular groove 5 behind the rings 6 and 7 communicates by means of apertures 11 with the inside of the centrifugal pump, for which reason the pressure above the atmospheric, that may arise at greater pumping speeds, will act on the rings 6 and 7 in an axial direction so that the ring 7 will become pressed against the sliding surface 8 and thereby will seal thereagainst. Under the influence of the same pressure the soft rubber ring 6 is pressed against the ring 7 as well as against the surrounding wall of the holder ring 4 so that the clearance 12 between this wall and the ring 7 is effectively sealed. The deformation of the elastic ring under the pressure conditions existing will contribute to the effectiveness of the seal.

According to Fig. 2 the pressure on the rings 6 and 7 is supplied from outside. The space behind the rings 6 and 7 communicates namely in this case via a piping 13 with the pressure side 14 of the centrifugal pump, Fig. 3. In this piping 13 is arranged a valve 15, by means of which the pressure can be regulated so that a suitable relation between the sealing effect and the friction at the sliding surface 8 can be adjusted. The annular groove 5 is via a piping 16 also connected with the suction side 17 of the pump, Fig. 3, and also in this piping is mounted a valve 18, which makes possible a further regulation of the pressure acting on the rings 6 and 7 to place the rings in sealing contact with the surrounding surface and sliding surface respectively.

By means of the arrangement according to Figs. 2 and 3 the setting pressure on the rings 6 and 7 to place them in sealing contact will become proportional to the pressure for which sealing has to be done and further that the proportion between for instance the working pressure of the pump and the pressure on the seal to place rings 6 and 7 in sealing contact can be regulated so that least possible friction will arise at the sliding surface 8.

In the embodiment according to Figs. 2 and 3 that modification can also be considered in which the pressure acting on rings 6 and 7 to place them respectively in contact with the surrounding surface and sliding surface is obtained from a separate external pressure source.

In the schematically illustrated debarking machine shown in Figs. 4, 5 and 6 the log 19, which has to be debarked, is fed between a plurality, in the illustrated case four barking tools 20, which are fixed to piston rods 21 of pistons 22, movable in radially placed cylinders 23. These cylinders are mounted in a rotatable drum 24, which is supported by rollers 25 journaled in a housing 38. The drum 24 is driven by means of a chain wheel 39 operated by a conventional motor driven chain, not shown. During the operation of the machine the log is fed continuously in its longitudinal direction without being turned, while the barking tools 20 due to the rotation of the drum 24 rotate about the log and remove the bark by friction. The pressure acting on the pistons 22 to maintain the tools 20 in engagement with the log for debarking is produced by a pressure liquid or a pressure gas, which by means of conduits 26 is supplied from a suitable pressure source. These conduits 26 are connected to a stationary bearing member 27 for feeding fluid into an annular chamber 28 formed in the bearing member, Fig. 6. In this bearing member 27 there are also two annular grooves 5 of same type as in the previously described embodiments and in these grooves are journaled the sealing rings 6 and 7. The grooves 5 communicate with the chamber 28 via apertures 29. The drum 24 is provided with a hub 30, Fig. 4, which is surrounded by the bearing member 27. On this hub there is mounted a ring 31 and a ring 32 against which rings the sealing rings 7 are held in contact and thereby effect the required sealing. The pressure medium passes from chamber 28 through the apertures 29, into passages 33. The flow from the passage 33 on the right in Fig. 6 reaches an annular chamber 34 in the ring 32. From this chamber 34 the pressure medium passes through channels 35 formed in the ring 32 and channels 36 on the outside of the cylinders 23 to flow into the cylinders on the upper side of the pistons 22. The pressure medium that passes through the apertures 29 and the passage 33 to the left in Figs. 4 and 6 reaches the annular chamber 34 via the openings which are provided between the hub ribs 37, Fig. 6, formed on the inside of the bearing member 27 and the external surface of hub 30.

By the double arrangement of the sealing rings 6 and 7 in the embodiment according to Figs. 4 and 6 there results an arrangement in which the axial pressure produced by the pressure medium on the whole rotating part is equalized.

It is clear therefore that the present invention provides an arrangement in which two ring members cooperate to effect a seal between a stationary element and a rotating element and which fluid under pressure applies the force to effect the seal and one of the ring members is deformable to such an extent that the fluid under pressure is prevented from leaking by an additional seal effected upon deformation of one ring member.

Further and specifically the invention includes an annular inelastic ring of a material having self lubricating properties, which ring on one end is flat for sealing against a rotating surface and at its other end is chamfered or beveled to act as a guide surface so that the deformable ring is in effect wedged between this guide surface and a surrounding cylindrical surface formed in the stationary member.

In Figure 2 the deformable ring 6 has a diameter in excess of the thickness of the inelastic ring 7 so that upon deformation the ring 6 seals against the inner and outer walls defining the groove 5 and at the same time presses the end of ring 7 against disc 9.

In Figures 1 and 6 the diameter of the deformable ring 6 is less than the cross sectional thickness of the inelastic ring 7 so that in response to the fluid under pressure the ring 6 is deformed and wedged into the space between the cylindrical surface forming the grooves 5 in the stationary member 27 and the beveled inner end of ring 7.

Further it is specifically pointed out that the invention includes the combination of an inelastic self lubricating ring having a flat sealing face for engagement with a rotating part and a deformable ring acting on the inelastic ring to press the same against the rotating part and at the same time to seal against at least one stationary cylindrical surface.

Specifically the invention comprehends the disposition of the two aforementioned rings in a groove formed in the stationary member and into which groove fluid under pressure is admitted to effect the seal.

The invention is not limited to the illustrated embodiments and scopes of use. Thus other cross sections of the sealing rings respectively can be considered as well as other materials for the same for attaining the same purpose.

What I claim is:

1. Sealing means for effecting sealing between a stationary member of annular shape and a rotary means of annular shape having opposed spaced sealing surfaces, said stationary member including a portion disposed between the said sealing surfaces, the said portion having an annular chamber therein, annular grooves extending inwardly from the opposite sides of the said portion, said portion having apertures therein providing communication between the respective grooves and the annular chamber, conduit means communicating with the annular chamber for admitting fluid under pressure thereinto, and a pair of axially movable sealing rings in each groove, the rings having substantially the same outer diameter, one ring of each pair being adjacent a sealing surface and being of inelastic material having self lubricating properties, the other ring of each pair being between the first ring and the said annular chamber and being elastically deformable whereby fluid under pressure moves both rings of each pair axially to press the first mentioned ring of each pair into sealing engagement with a sealing surface and to deform the second mentioned ring of each pair into sealing engagement at least with the outer wall of the respective grooves and the disposition of the pairs of rings on opposite sides of the annular chamber equalizing the axial pressure produced on the rotatable member by the fluid under pressure.

2. Sealing means as claimed in claim 1 in which the inner face of each ring of inelastic material is inclined in a direction away from the said annular chamber and toward the outer wall of the groove whereby the elastically deformable ring is constrained by the said inclined face to seal against the outer wall of the groove, said first mentioned ring of each pair having a thickness less than the width of the grooves whereby fluid under pressure can pass beyond said rings, the said portion of the stationary member having a ribbed inner face to permit fluid to pass from one side of the chamber to the other and means for leading the fluid from the said other side of the chamber to a point of utilization in the rotatable member.

3. In a sealing arrangement, a rotary ring including spaced walls and a hub portion defining an annular channel, one wall having fluid ports therein, a stationary annular member housed between the spaced walls, said annular member having an annular groove extending inwardly from the opposite sides thereof and each respectively facing one of said spaced walls, an annular fluid receiving chamber within said stationary annular member, said annular member having ducts therein providing communication between the respective grooves and the said fluid receiving chamber, a pair of axially movable sealing rings housed in each groove in said annular member, each pair including a ring of inelastic material having lubricating properties disposed in the respective grooves and respectively adjacent each of said spaced walls, each said inelastic ring having a beveled inner face inclined in the direction extending away from the annular chamber and toward the outer wall of the respective groove, each inelastic ring further having a thickness less than the width of its associated groove so that fluid under pressure can pass each said inelastic ring, an elastically deformable ring in each groove rearwardly of the inelastic ring therein and deformable in response to fluid pressure to seal against the outer wall of each groove and to apply axial sealing pressure on the adjacent inelastic ring to seal the same against the adjacent one of said spaced walls, the inner periphery of the stationary annular member having spaced ribs formed therein to provide fluid channels between the interior of the annular member and the exterior of the hub portion, the inelastic ring on the side of the annular member adjacent said one wall being radially outward of the fluid ports in said one wall whereby fluid under pressure can enter the annular chamber, flow through the grooves to effect a seal between the deformable rings and the outer wall of each groove and between the inelastic rings and the respectively spaced walls of the rotary ring, the fluid on one side of the annular chamber after passing the sealing rings flowing through the ports and the fluid on the opposite side of the annular chamber after passing the sealing rings flowing through the space between the ribs on the inner periphery of the stationary annular member and thence to the ports and the disposition of the sealing rings on the opposite sides of the annular chamber equalizing the axial pressure exerted on the rotary ring by the fluid.

4. A sealing means for apparatus of the type where an external pressure medium has to be transmitted by a stationary bearing member and a rotatable member and in which the rotatable member has spaced, facing sealing surfaces, said stationary member having an inlet for fluid under pressure, said sealing means comprising two pairs of axially movable sealing rings respectively loosely housed in the stationary member on opposite sides of the fluid inlet and confined by an outer cylindrical surface, the said rings of each pair having substantially the same outer diameter, one ring of each pair being of inelastic material and having self lubricating properties and disposed adjacent a sealing surface on the rotary member, the other ring of each pair being disposed between the inlet for fluid under pressure and the first mentioned ring of the pair and being of elastically deformable material, one of said surfaces having fluid outlet means therein and means for leading fluid from one side of said stationary member to the other whereby fluid under pressure entering the inlet deforms the respective elastically deformable rings into sealing engagement with the cylindrical surface, applies the respective inelastic rings into sealing engagement with the rotatable sealing surfaces and flows past the pairs of rings on both sides of the fluid inlet through the stationary member and the seal and through the outlet means for utilization and at the same time equalizing the effect of the axial pressure exerted on the rotatable member by the fluid under pressure.

References Cited in the file of this patent

UNITED STATES PATENTS

| | | |
|---|---|---|
| 2,104,355 | Rupp et al. | Jan. 4, 1938 |
| 2,494,598 | Waring | Jan. 17, 1950 |
| 2,503,086 | Albright | Apr. 4, 1950 |
| 2,558,087 | Hall | June 26, 1951 |
| 2,623,558 | Andersson | Dec. 30, 1952 |
| 2,670,973 | Ginther et al. | Mar. 2, 1954 |